United States Patent
Reed

(10) Patent No.: US 12,409,886 B2
(45) Date of Patent: Sep. 9, 2025

(54) DEVICE AND METHOD FOR STRENGTHENING BALL JOINT MOUNTING ORIENTATION TO A DOUBLE SHEAR CONFIGURATION

(71) Applicant: Alexander W. Reed, Charlotte, NC (US)

(72) Inventor: Alexander W. Reed, Charlotte, NC (US)

( * ) Notice: Subject to any disclaimer, the term of this patent is extended or adjusted under 35 U.S.C. 154(b) by 0 days.

(21) Appl. No.: 18/738,125

(22) Filed: Jun. 10, 2024

(65) Prior Publication Data

US 2025/0178667 A1    Jun. 5, 2025

Related U.S. Application Data

(60) Provisional application No. 63/604,446, filed on Nov. 30, 2023.

(51) Int. Cl.
*B62D 7/18* (2006.01)
*B60G 7/00* (2006.01)

(52) U.S. Cl.
CPC ............... *B62D 7/18* (2013.01); *B60G 7/005* (2013.01); *B60G 2204/416* (2013.01); *B60G 2206/50* (2013.01)

(58) Field of Classification Search
CPC .......... B62D 7/18; B60G 7/005; B60G 7/008; B60G 2204/148; B60G 2204/416; B60G 2206/50
See application file for complete search history.

(56) References Cited

U.S. PATENT DOCUMENTS

| | | | | |
|---|---|---|---|---|
| 3,039,787 A | * | 6/1962 | Meyer | B60G 7/005 280/124.136 |
| 3,749,415 A | | 7/1973 | Sampatacos | |
| 3,908,480 A | * | 9/1975 | Afanador | B62D 7/18 74/511 R |
| 5,120,150 A | * | 6/1992 | Kozyra | B60G 7/008 403/297 |
| 6,398,240 B1 | * | 6/2002 | Taylor | B60T 1/065 280/93.511 |
| 6,402,169 B1 | * | 6/2002 | Schafer | B60G 3/20 280/124.136 |
| 6,481,731 B2 | | 11/2002 | McHale | |

(Continued)

*Primary Examiner* — Laura Freedman
(74) *Attorney, Agent, or Firm* — Jeffrey C. Watson, Esq.; Grell & Watson Patent Attorneys PC

(57) ABSTRACT

A support device is configured for strengthening a single shear mounting configuration of a ball joint affixed on a suspension knuckle at a first location. The support device includes a support bracket with at least one attachment member and a support mechanism. The at least one attachment member is configured for attaching the support bracket to the suspension knuckle approximate a spherical bearing attached to the suspension knuckle at the first location. The support mechanism is affixed to the at least one attachment member. The support mechanism is configured to support the spherical bearing at a second location on the spherical bearing. Wherein, the support bracket is configured to provide a double shear mounting configuration of the spherical bearing on the suspension knuckle via the combined support from the first location in combination with the second location on the spherical bearing.

18 Claims, 9 Drawing Sheets

(56) References Cited

U.S. PATENT DOCUMENTS

| | | | |
|---|---|---|---|
| 6,932,366 B2* | 8/2005 | Jones | B62D 17/00 |
| | | | 280/93.512 |
| 7,090,232 B2 | 8/2006 | Kim | |
| 7,354,052 B2 | 4/2008 | Orimoto et al. | |
| 8,132,820 B2* | 3/2012 | Lee | B60G 7/005 |
| | | | 280/93.511 |
| 8,240,687 B2 | 8/2012 | Kurosu | |
| 10,207,737 B2* | 2/2019 | Gottschalk | F16D 51/00 |
| 11,066,099 B2* | 7/2021 | Czajkowski | B60G 7/005 |
| 11,192,414 B1* | 12/2021 | Berardi | B62K 25/24 |
| 2006/0027986 A1* | 2/2006 | Ziech | B62D 7/146 |
| | | | 280/93.512 |
| 2008/0240847 A1* | 10/2008 | Crouse | B62D 17/00 |
| | | | 403/122 |
| 2017/0008558 A1* | 1/2017 | Krüger | F16C 11/0695 |

* cited by examiner

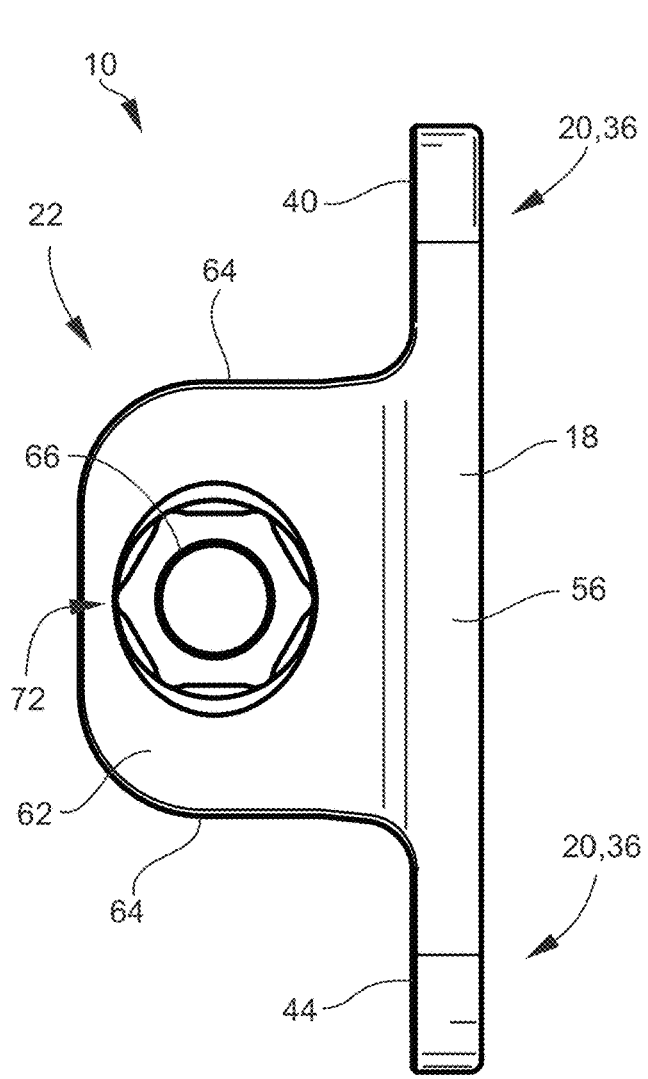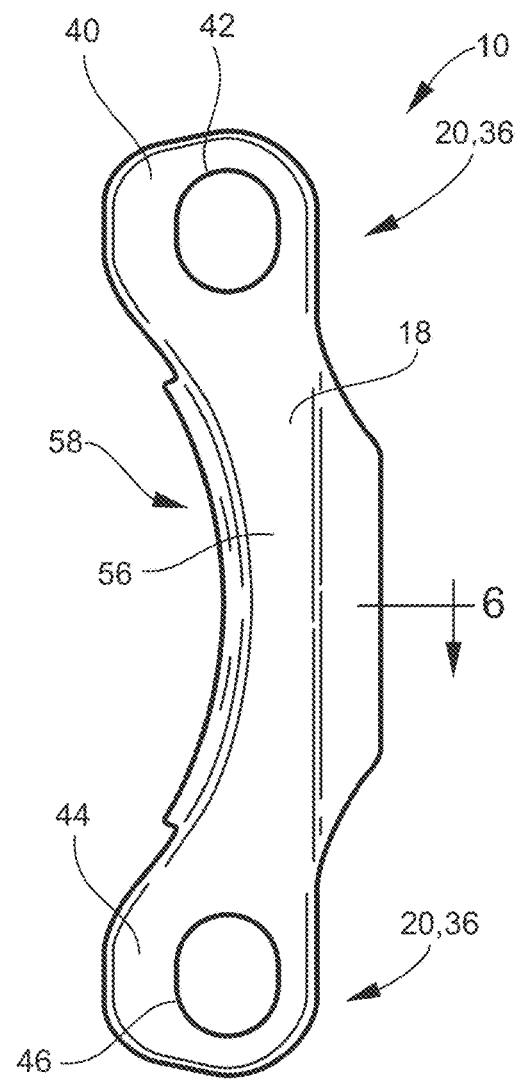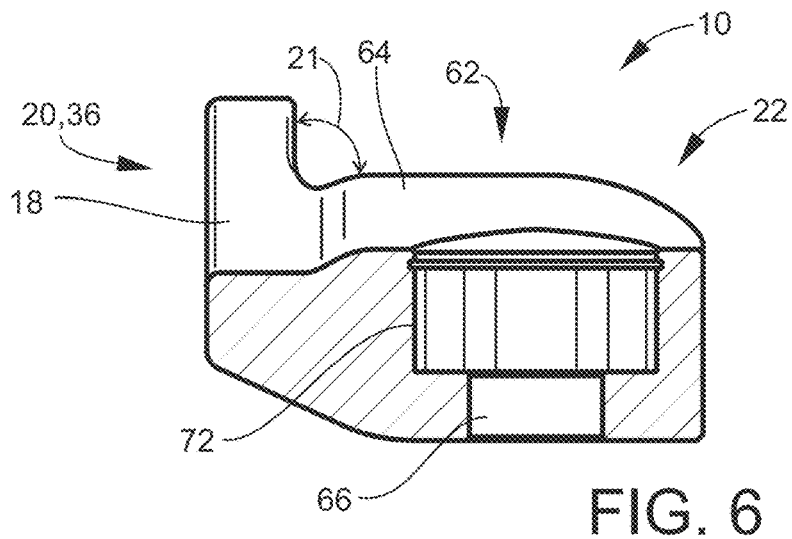
FIG. 4
FIG. 5
FIG. 6

DEVICE AND METHOD FOR STRENGTHENING BALL JOINT MOUNTING ORIENTATION TO A DOUBLE SHEAR CONFIGURATION

CROSS-REFERENCE TO RELATED APPLICATIONS

This application claims benefit to U.S. Provisional Patent Application No. 63/604,446 filed on Nov. 30, 2023, entitled Device and Method for Strengthening Ball Joint Mounting Orientation to a Double Shear Configuration, which is incorporated by reference in its entirety.

FIELD OF THE DISCLOSURE

The present disclosure relates to ball joints or spherical bearings for vehicles. More specifically, the present disclosure relates to a device and method for strengthening ball joint mounting orientation to a double shear mounting configuration with a spherical bearing.

BACKGROUND

Generally speaking, in an automobile, ball joints are spherical bearings that connect the suspension components to the suspension knuckles (like a steering knuckle, spindle, the like, etc.) and are used on virtually every automobile made. Ball joints functions resemble the ball-and-socket joints found in most animals. A ball joint consists of a bearing stud and socket enclosed in a casing. Typically, the bearing stud, socket and casing are all made of steel. The bearing stud is tapered and threaded, and fits into a tapered hole in the suspension knuckle. A protective encasing may be used to prevent dirt from getting into the joint assembly. Usually, this protective casing may be a rubber-like boot that allows movement and expansion of lubricant.

One problem associated with ball joints used to connect the suspension components to the suspension knuckle of vehicles is the shear forces or loads applied to such ball joints. Because the ball joints have a single mounting point on the suspension knuckle and the suspension component, these ball joints are mounted in a single shear configuration. Namely, the shear forces or loads applied on these ball joints are applied to the bearing stud threaded into the tapered hole in the suspension knuckle, as that is the single mounting point to the suspension knuckle. In addition, these shear forces and loads are required to be carried from the bearing stud to the socket mounted in the suspension component in a single mounting point. These shear forces or loads applied to such ball joints require the ball joints and associated hardware to be manufactured to withstand such shear forces or loads which leads to added costs, bulk and weight to the vehicle. In addition, these shear forces or loads, especially in off-road vehicles and environments, often result in ball joints regularly wearing down, failing and/or breaking, thereby, requiring such ball joints to be replaced far more often than desired. As such, there is clearly a need to provide a stronger and more stable mounting configuration for such ball joints, especially on off-road vehicles, like UTVs, Side-by-Sides, recreational off-road vehicles, the like, etc.

The instant disclosure may be designed to address at least certain aspects of the problems or needs discussed above by providing a device and/or method for strengthening ball joint mounting orientation to a double shear mounting configuration with a spherical bearing.

SUMMARY

The present disclosure may solve the aforementioned limitations of the currently available ball joints mounting configurations on suspension knuckles of vehicles, by providing a support device configured for strengthening a single shear mounting configuration of a ball joint affixed on a suspension knuckle at a first location. The support device may include a support bracket with at least one attachment member and a support mechanism. The at least one attachment member may be configured for attaching the support bracket to the suspension knuckle approximate a spherical bearing. The support mechanism may be affixed to the at least one attachment member. The support mechanism may be configured to support the spherical bearing at a second location on the spherical bearing. Wherein, the support bracket may be configured to provide a double shear mounting configuration of the spherical bearing on the suspension knuckle via the combined support from the first location in combination with the second location on the spherical bearing.

One feature of the disclosed support device may be that the provided double shear mounting configuration can be designed or configured to create a stronger and more stable mounting configuration from a ball joint to a spherical bearing on the suspension knuckle.

Another feature of the disclosed support device may be that it can be designed or configured to modify an existing ball joint assembly from the single shear mounting configuration to the double shear mounting configuration with a spherical bearing. Wherein, the support device may be designed or configured to convert an OEM suspension pivot ball joint between a suspension component and the suspension knuckle from the single shear configuration to the double shear mounting configuration with a spherical bearing.

Another feature of the disclosed support device may be that it can be designed or configured to greatly strengthen the single shear mounting configuration of the OEM suspension pivot ball joint and reduce stress on hardware.

In select embodiments of the disclosed support device, the at least one attachment member may include at least one attachment flange. The at least one attachment flange may be configured and shaped for mounting the support bracket to the suspension knuckle. In select embodiments, the at least one attachment member may include two of the attachment flanges. Each of the two attachment flanges may be configured and shaped for mounting the support bracket to the suspension knuckle.

In select embodiments, the disclosed support device may further include hardware, welding, or a combination thereof configured for mounting each of the attachment flanges of the support bracket to the suspension knuckle.

In select embodiments of the disclosed support device, each of the at least one attachment flanges may include an attachment hole therethrough. Each of the attachment holes may be configured for receiving a mechanical fastener therethrough for mounting the support bracket to the suspension knuckle. In select embodiments, the at least one attachment member may include two attachment flanges, a first attachment flange with a first attachment hole therethrough and a second attachment flange with a second attachment hole therethrough. Wherein, the first attachment hole on the first attachment flange may be configured to mount the support bracket to an existing first threaded hole on the suspension knuckle via a first bolt, and the second attachment hole on the second attachment flange may be configured to mount the support bracket to an existing second threaded hole on the suspension knuckle via a second bolt.

In select embodiments, the support device may include a connecting member affixed between the two attachment flanges. The connecting member may be configured for connecting the support mechanism with the two attachment flanges. In select embodiments, the connecting member may include a cutout. The cutout may be configured to fit around a suspension member connected to the suspension knuckle.

In select embodiments of the support device, the support mechanism may include a support plate connected at an angle to the at least one attachment member. In select embodiments, the support plate may include side members configured to provide rigidity between the support plate and the at least one attachment member.

In select embodiments of the support device, the support mechanism may include a support hole. The support hole may be configured to receive a top portion of a stud of the spherical bearing. In select embodiments, the support mechanism may further include a nut seat connected with the support hole. The nut seat may be sized and shaped to support a nut threaded onto the top portion of the stud of the spherical bearing.

In another aspect, the instant disclosure embraces a suspension knuckle. The suspension knuckle may generally include the support device for strengthening ball joint mounting orientation to a double shear mounting configuration with a spherical bearing in any of the embodiments and/or combination of embodiments shown and/or described herein. The suspension knuckle may generally include a spherical bearing affixed to the suspension knuckle at a first location. The support device may include the support bracket mounted or affixed on the suspension knuckle. The support bracket may include at least one attachment member attached to the suspension knuckle approximate the spherical bearing, and a support mechanism affixed to the at least one attachment member. The support mechanism may be configured to support the spherical bearing at a second location on the spherical bearing.

One feature of the disclosed suspension knuckle may be that the support bracket is configured to provide a double shear mounting configuration of the spherical bearing on the suspension knuckle via the combined support from the first location in combination with the second location on the spherical bearing.

Another feature of the disclosed suspension knuckle may be that the double shear mounting configuration of the spherical bearing may be designed or configured to create a stronger and more stable mounting configuration for the spherical bearing on the suspension knuckle.

In select embodiments of the disclosed suspension knuckle, the at least one attachment member may include two attachment flanges. Each of the two attachment flanges may be configured and shaped for mounting the support bracket to the suspension knuckle.

Another feature of the disclosed suspension knuckle may be that the support device can further include hardware, welding, or a combination thereof configured for mounting each of the attachment flanges of the support bracket to the suspension knuckle.

In select embodiments of the disclosed suspension knuckle, the support device may further include a connecting member affixed between the two attachment flanges. The connecting member may be configured for connecting the support mechanism with the two attachment flanges.

In select embodiments of the disclosed suspension knuckle, the support mechanism may include a support plate connected at an angle to the at least one attachment member. In select embodiments, the support plate may include side members configured to provide rigidity between the support plate and the at least one attachment member.

Another feature of the disclosed suspension knuckle may be that the support mechanism can include a support hole configured to receive a top portion of a stud of the spherical bearing;

Another feature of the discloses suspension knuckle may be that the support mechanism can include a nut seat connected with the support hole. The nut seat may be sized and shaped to support a nut threaded onto the top portion of the stud of the spherical bearing.

In select embodiments of the disclosed suspension knuckle, the two attachment flanges may include a first attachment flange with a first attachment hole therethrough and a second attachment flange with a second attachment hole therethrough. Wherein, the first attachment hole on the first attachment flange may be configured to mount the support bracket to an existing first threaded hole on the suspension knuckle via a first bolt, and the second attachment hole on the second attachment flange may be configured to mount the support bracket to an existing second threaded hole on the suspension knuckle via a second bolt.

In another aspect, the instant disclosure embraces a method for strengthening a single shear mounting configuration of a ball joint affixed on a suspension knuckle at a first location. The method may generally include the support device for strengthening ball joint mounting orientation to a double shear mounting configuration in any of the embodiments and/or combination of embodiments shown and/or described herein. The method may first include replacing the ball joint with a spherical bearing attached to the suspension knuckle at the first location. The method may then generally include providing the disclosed support bracket in any of the embodiments and/or combination of embodiments shown and/or described herein. As such, the support bracket provided by the disclosed method may generally include at least one attachment member configured for attaching the support bracket to the suspension knuckle approximate a spherical bearing, and a support mechanism affixed to the at least one attachment member. The support mechanism may be configured to support the spherical bearing at a second location on the spherical bearing. With this provided support device, the method may further include attaching the support bracket to the suspension knuckle whereby the support mechanism supports the spherical bearing at the second location on the spherical bearing and provides a double shear mounting configuration of the spherical bearing.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which:

FIG. 4 is a top view of the device from FIG. 2;

FIG. 5 is a front view of the device from FIG. 2;

FIG. 6 is a cross-sectional view of the device from FIG. 2 taken from the cross-sectional angle shown in FIG. 5;

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Figure 1:
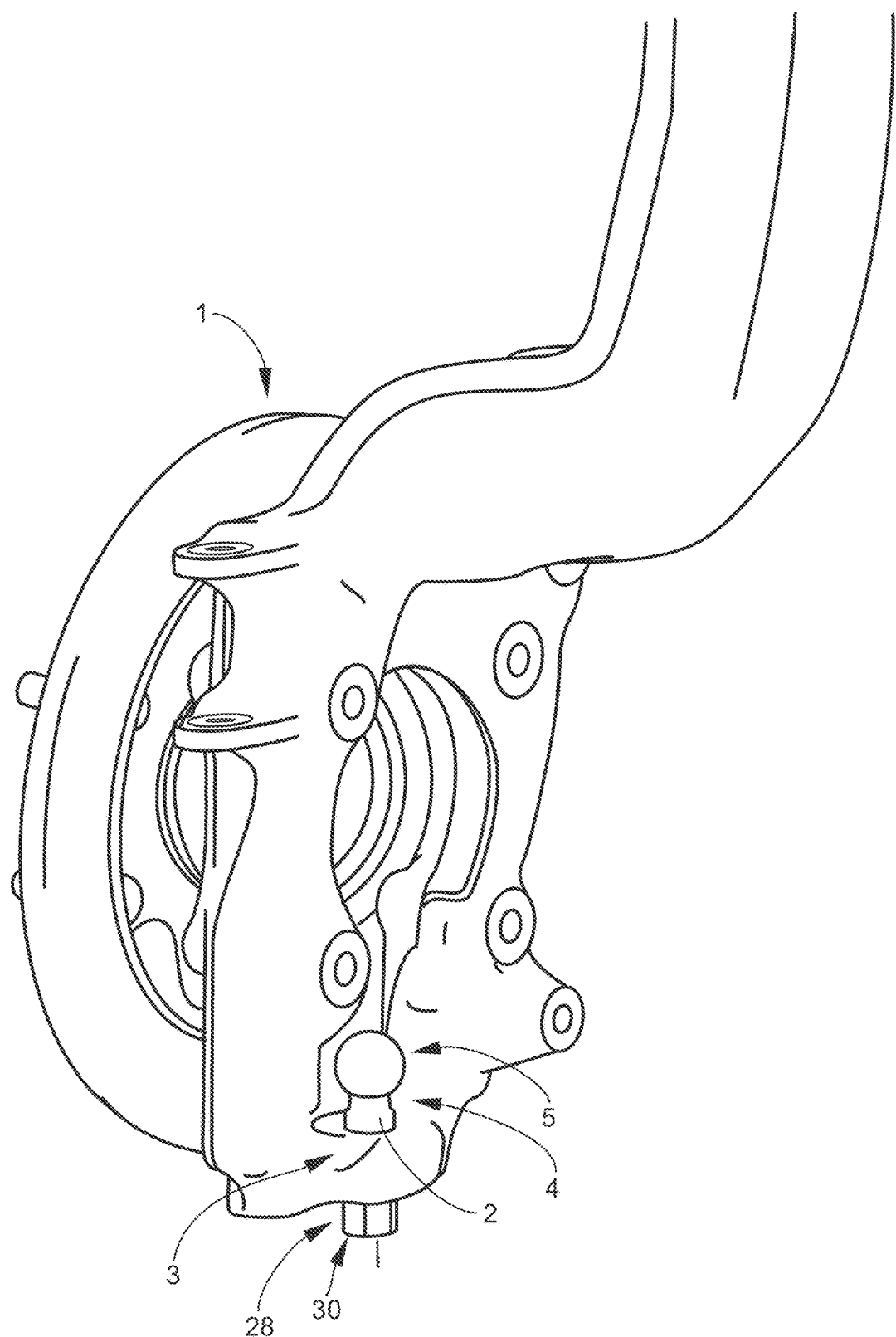
FIG. 1 is a perspective view of a suspension knuckle according to the prior art with a ball joint stud mounted thereon through a threaded hole in the suspension knuckle.
Figure 2:
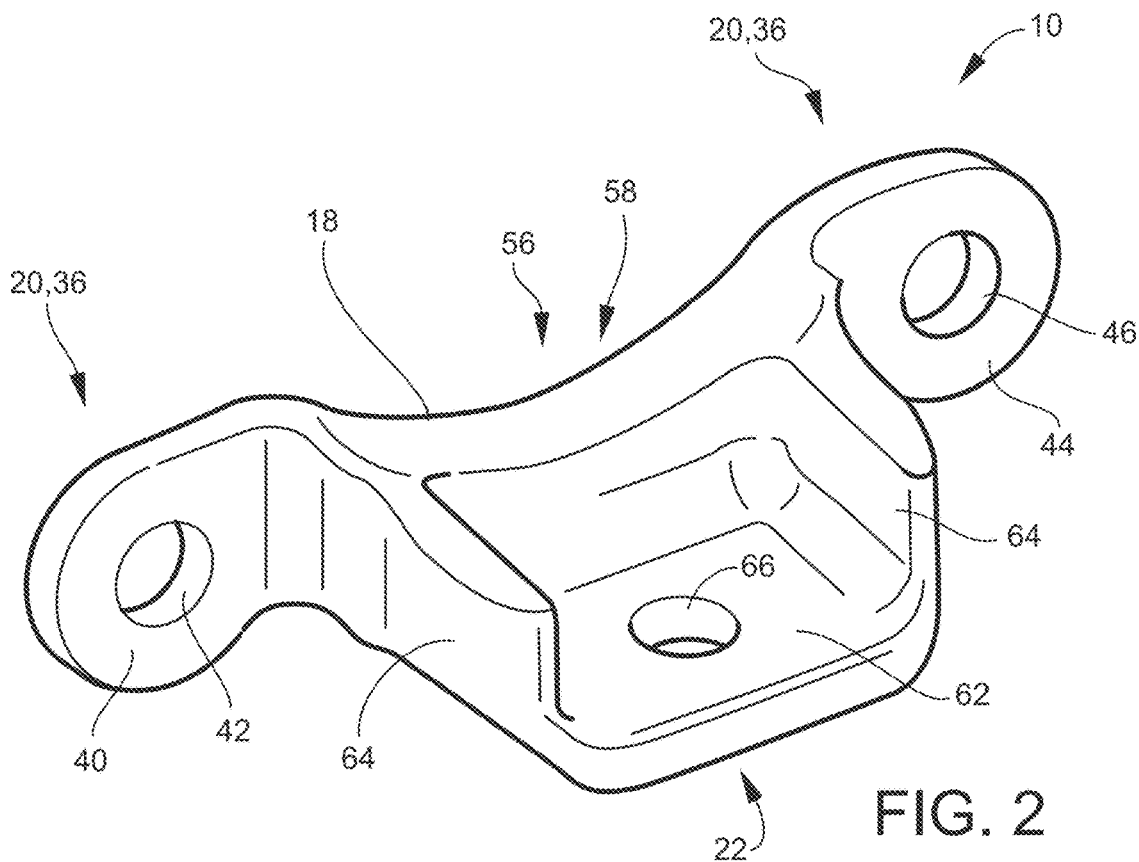
FIG. 2 is a perspective view of the device for strengthening ball joint mounting orientation to a double shear mounting configuration with a spherical bearing according to select embodiments of the instant disclosure.
Figure 3:
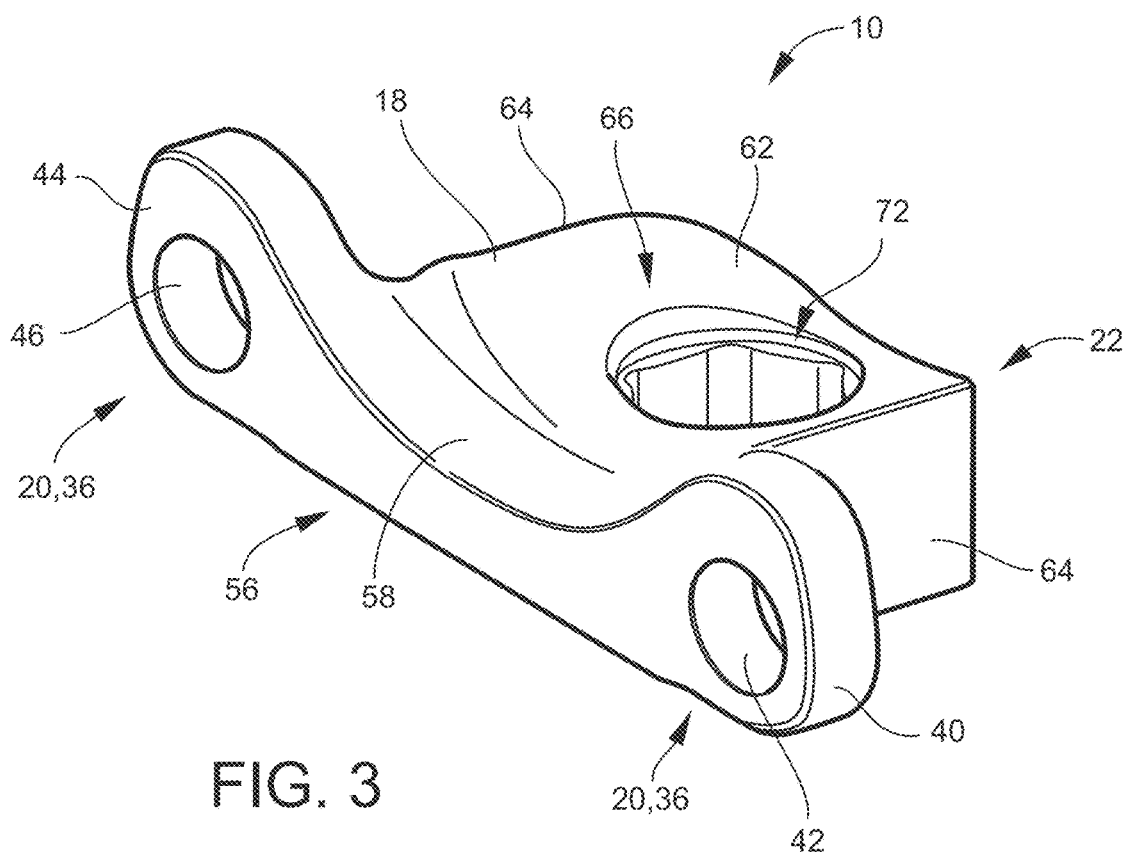
FIG. 3 is another perspective view of the device from FIG. 2.
Figure 7:
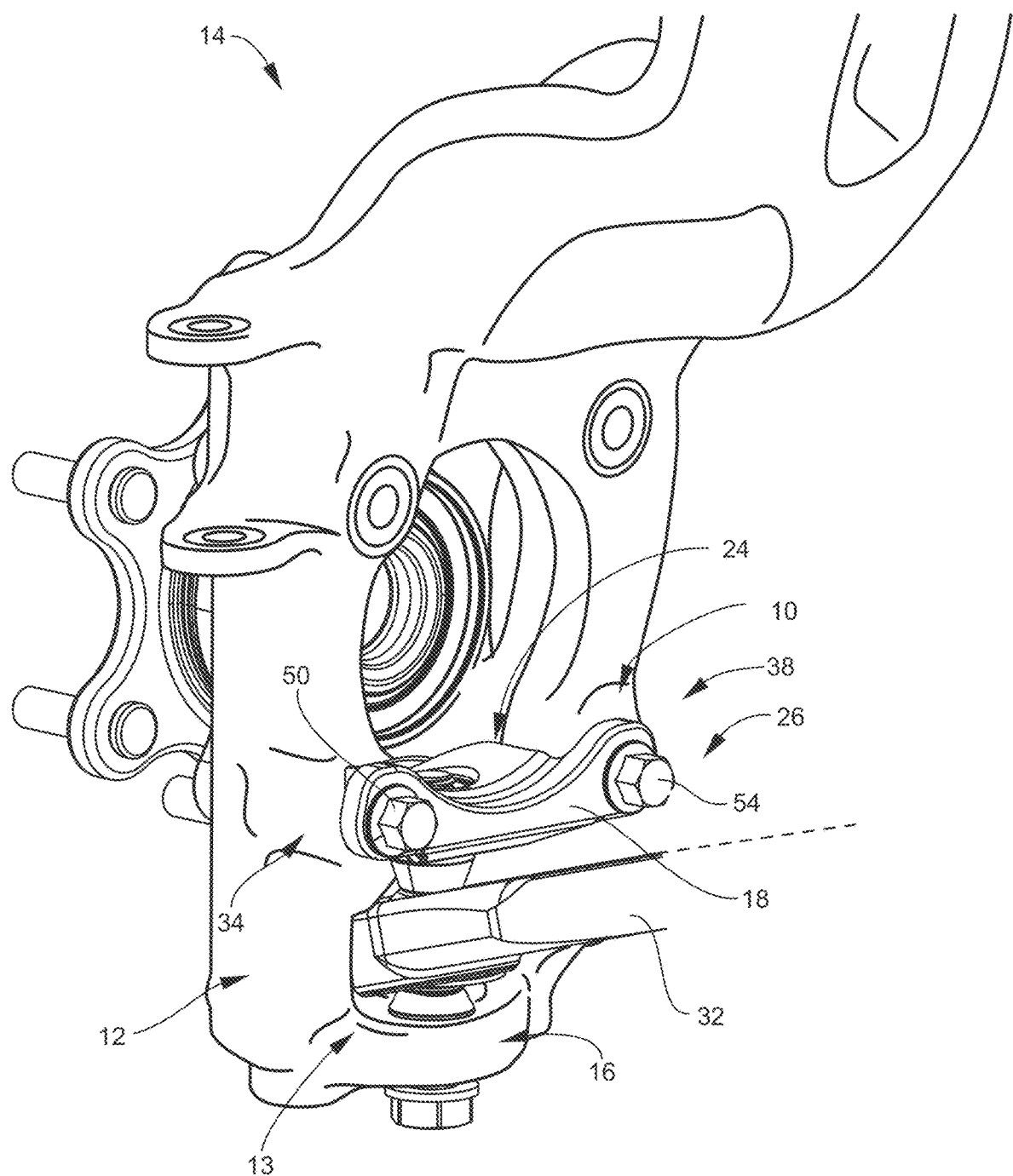
FIG. 7 is a perspective view of a spherical bearing mounted in a double shear mounting configuration between a suspension knuckle and a suspension component with the device from FIG. 2 according to select embodiments of the instant disclosure.

Referring first to FIG. 1, a perspective view of prior art suspension knuckle 1 according to the prior art with prior art ball joint stud 2 mounted thereon through prior art mounting hole 3 in prior art suspension knuckle 1 is shown. As shown, prior to the instant disclosure, prior art ball joint 4 was mounted with prior art single shear mounting configuration 5 to prior art suspension knuckle 1. The instant disclosure may be designed to address at least certain aspects of the problems or needs of such prior art single shear mounting configuration 5 by providing device 10 and/or method 100 for strengthening such ball joint 4 mounting orientations to double shear mounting configuration 12.

Referring now to FIGS. 2-12, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

Referring to FIGS. 2-11, the present disclosure may solve the aforementioned limitations of the currently available ball joints vehicles and their mounting configurations between suspension knuckles and suspension components, by providing the disclosed device 10 and/or method 100 configured for strengthening such ball joint mounting orientation to double shear mounting configuration 12 with spherical bearing 13.

Device 10 for strengthening such ball joint mounting orientation to double shear mounting configuration 12 may generally include support bracket 18 with at least one attachment member 20 and a support mechanism 22. The at least one attachment member 20 may be configured for attaching the support bracket to the suspension knuckle 14 approximate spherical bearing 13. The support mechanism 22 may be affixed to the at least one attachment member 20. The support mechanism 22 may be configured to support the spherical bearing 13 at second location 24 on the spherical bearing 13. Wherein, as shown in the Figures, support bracket 18 may be configured to provide double shear mounting configuration 12 of spherical bearing 13 on suspension knuckle 14 via the combined support from first location 16 in combination with second location 24 on spherical bearing 13.

As used herein, double shear may be defined as being able to simultaneously support an object on two sides. In this case, double shear may refer to a spherical bearing 13 that is mounted between two surfaces via a bolt or piece of hardware holding the assembly together.

As best shown in FIGS. 7 and 9-11, one feature of the disclosed support device 10 may be that the provided double shear mounting configuration 12 can be designed or configured to create stronger and more stable mounting configuration 26 for spherical bearing 13 on suspension knuckle 14.

When replacing the ball joint of the prior art with spherical bearing 13, the same mounting hole 15 (see mounting hole 3 from FIG. 1) may be utilized for supporting spherical bearing 13 at first location 16. See FIGS. 7-11). The stud 70 of the spherical bearing 13 may be inserted through same mounting hole 15. Or, in select embodiments where same mounting hole 15 is threaded, sleeve 17 may be inserted through said same mounting hole 15, where sleeve 17 is configured for supporting stud 70 therein said threaded same mounting hole 15.

Still referring to FIGS. 7 and 9-11, another feature of the disclosed support device 10 may be that it can be designed or configured to modify existing ball joint assembly 28 from the single shear mounting configuration of the prior art (see FIG. 1) to double shear mounting configuration 12 with spherical bearing 13. Wherein, support device 10 may be designed or configured to convert OEM suspension pivot ball joint 30 between suspension component 32 and suspension knuckle 14 from the single shear configuration (see FIG. 1) to double shear mounting configuration 12 with spherical bearing 13.

Still referring to FIGS. 7 and 9-11, another feature of the disclosed support device 10 may be that it can be designed or configured to greatly strengthen the single shear mounting configuration of the prior art (see FIG. 1) of the OEM suspension pivot ball joint 30 and reduce stress on hardware.

Referring now specifically to FIGS. 2-6, various embodiments of support device 10 are shown. Support device 10 may generally include any configuration size or shape for converting the single shear mounting configuration of the prior art (see FIG. 1) to double shear mounting configuration 12, as shown in FIGS. 7 and 9-11. In select embodiments of the disclosed support device 10, the at least one attachment member 20 may include at least one attachment flange 36. The at least one attachment flange 36 may be configured and shaped for mounting support bracket 18 to suspension knuckle 14. In select embodiments, as shown in FIGS. 2-6, the at least one attachment member 20 may include two of the attachment flanges 36. Each of the two attachment flanges 36 may be configured and shaped for mounting support bracket 18 to suspension knuckle 14.

Figure 8:
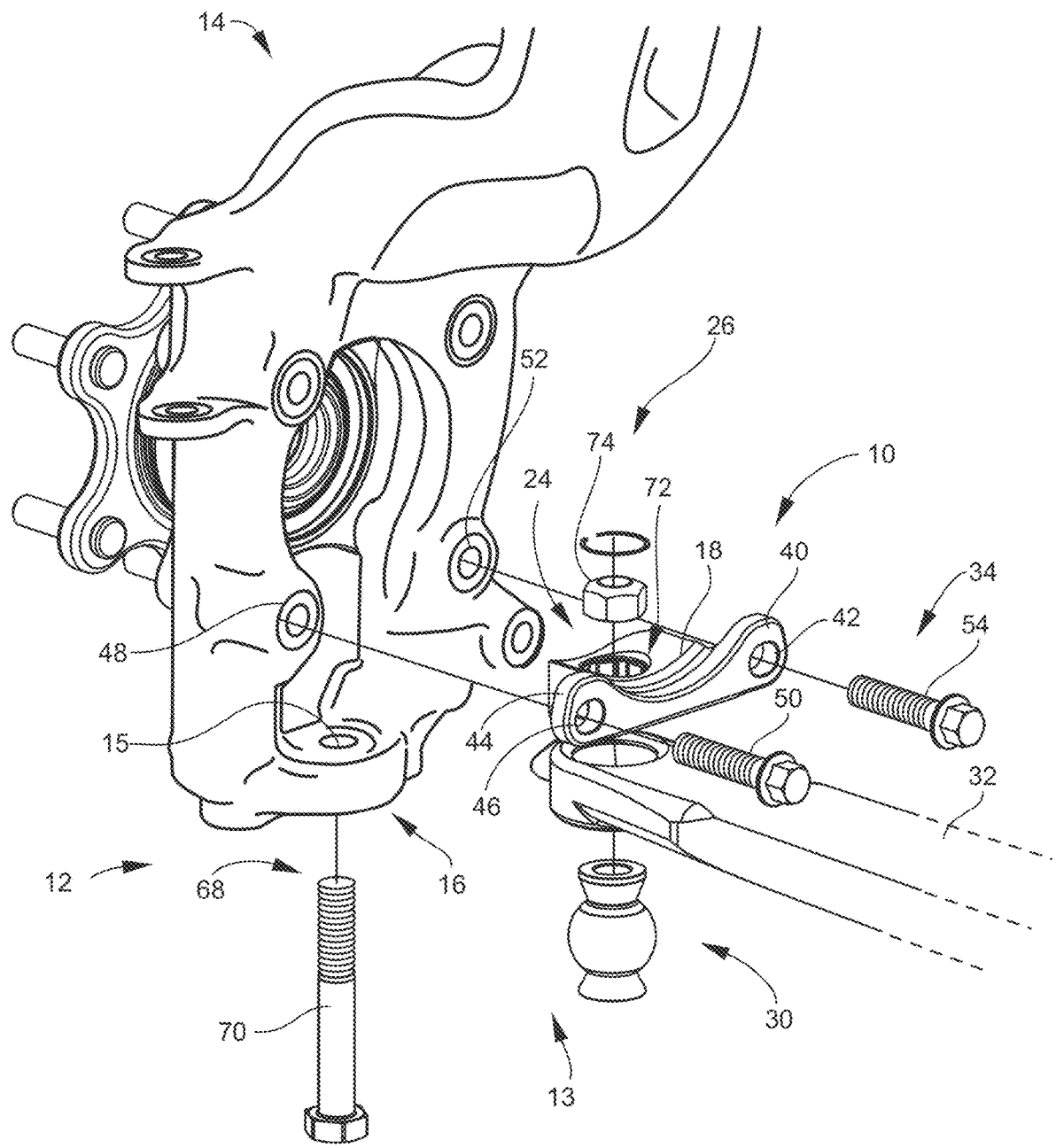
FIG. 8 is a partially disassembled perspective view of the spherical bearing mounted in a double shear mounting configuration of FIG. 7 with the device from FIG. 2.

As best shown in FIG. 8, in select embodiments, the disclosed support device 10 may further include hardware, welding, or a combination thereof configured for mounting each of the attachment flanges 36 of the support bracket 18 to suspension knuckle 14.

Referring back to FIGS. 2-6, in select embodiments of the disclosed support device 10, each of the at least one attachment flanges 36 may include an attachment hole (42, 46) therethrough. Each of the attachment holes (42, 46) may be configured for receiving a mechanical fastener therethrough for mounting the support bracket 18 to the suspension knuckle 14. In select embodiments, the at least one attachment member 20 may include two attachment flanges 36, a first attachment flange 40 with first attachment hole 42 therethrough and a second attachment flange 44 with a second attachment hole 46 therethrough. As best shown in FIG. 8, the first attachment hole 42 on the first attachment flange may be configured to mount the support bracket 18 to an existing first threaded hole 48 on the suspension knuckle 14 via first bolt 50, and second attachment hole 46 on the second attachment flange 44 may be configured to mount the support bracket 18 to an existing second threaded hole 52 on the suspension knuckle 14 via a second bolt 54. However, the instant disclosure is not so limited, and support bracket 18 may be mounted, affixed, or welded to suspension knuckle 14 by any means and at any desired location to support spherical bearing 13 at second location 24.

Figure 11:
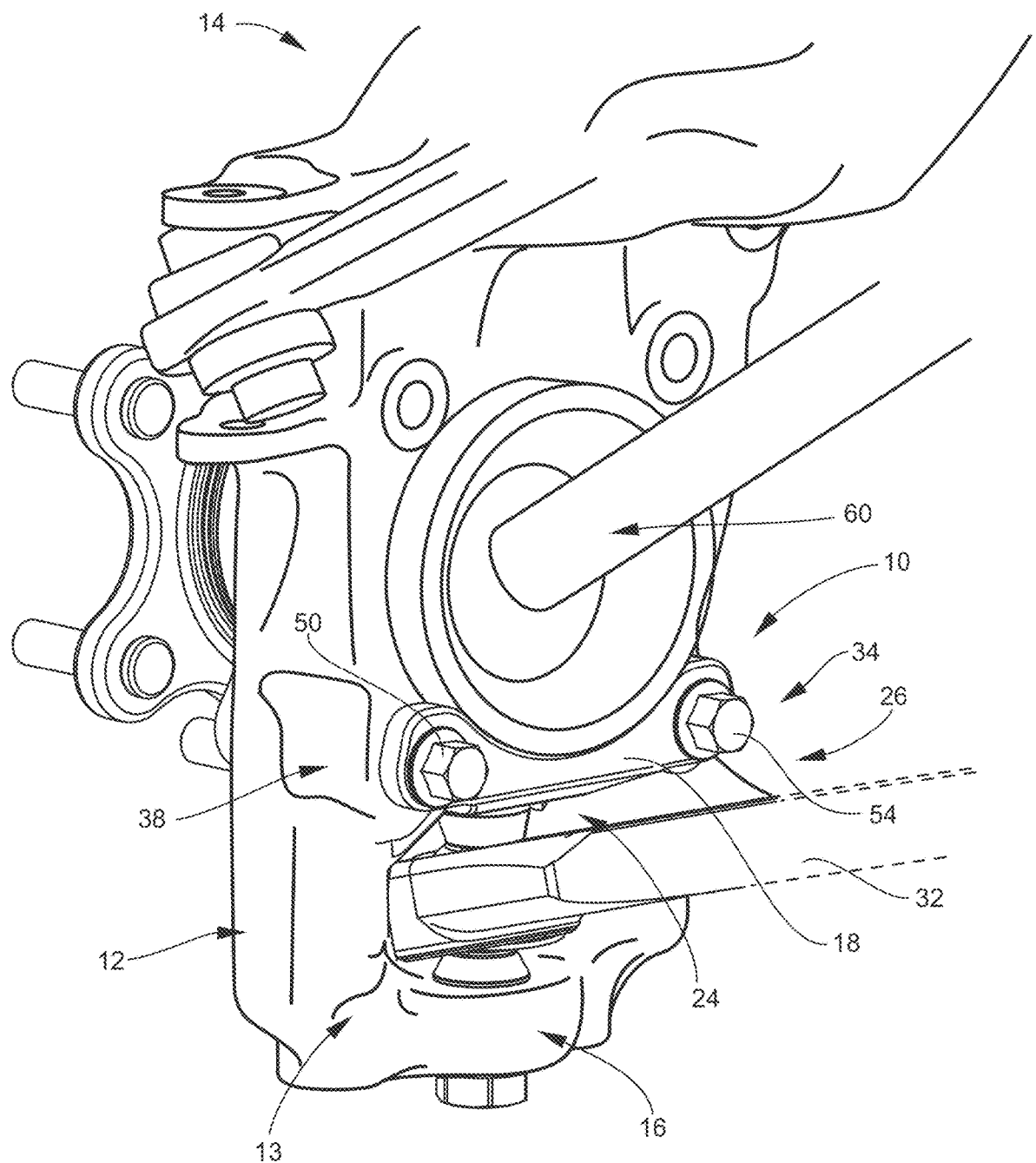
FIG. 11 is a perspective view of a spherical bearing mounted in a double shear mounting configuration between a suspension knuckle and a suspension component with the device from FIG. 2 according to select embodiments of the instant disclosure.

Still referring to FIGS. 2-6, in select embodiments, support device 10 may include connecting member 56. Connecting member 56 may be affixed between the two attachment flanges 36. Connecting member 56 may be configured for connecting support mechanism 22 with the two attachment flanges 36. In select embodiments, connecting member 56 may include cutout 58 or the like. The cutout 58 may be configured to fit around suspension member 60 connected to suspension knuckle 14, like as best shown in FIG. 11. As shown, the orientation of the components is a usable and functional suspension assembly. Cutout 58 may be designed or shaped to fit various sizes and shapes of suspension members 60 connected to suspension knuckle 14. As shown in FIGS. 2-6, in select embodiments cutout 58 on connecting member 56 may be a concave shape cutout of the top of connecting member 56. In addition, in other select embodiments, support bracket 18 may not require cutout 58.

Figure 9:
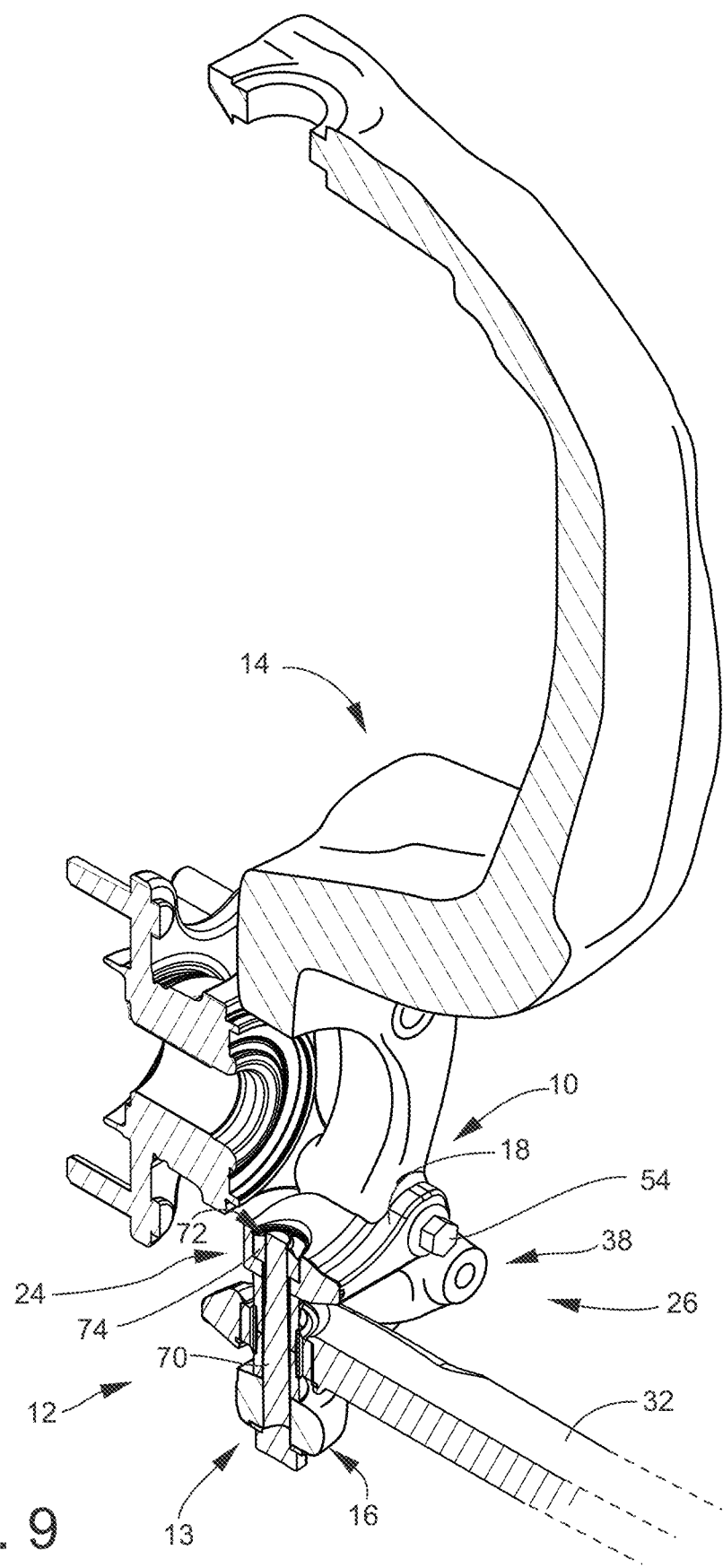
FIG. 9 is a cross-sectional perspective view of the spherical bearing mounted in a double shear mounting configuration of FIG. 7 with the device from FIG. 2.
Figure 10:
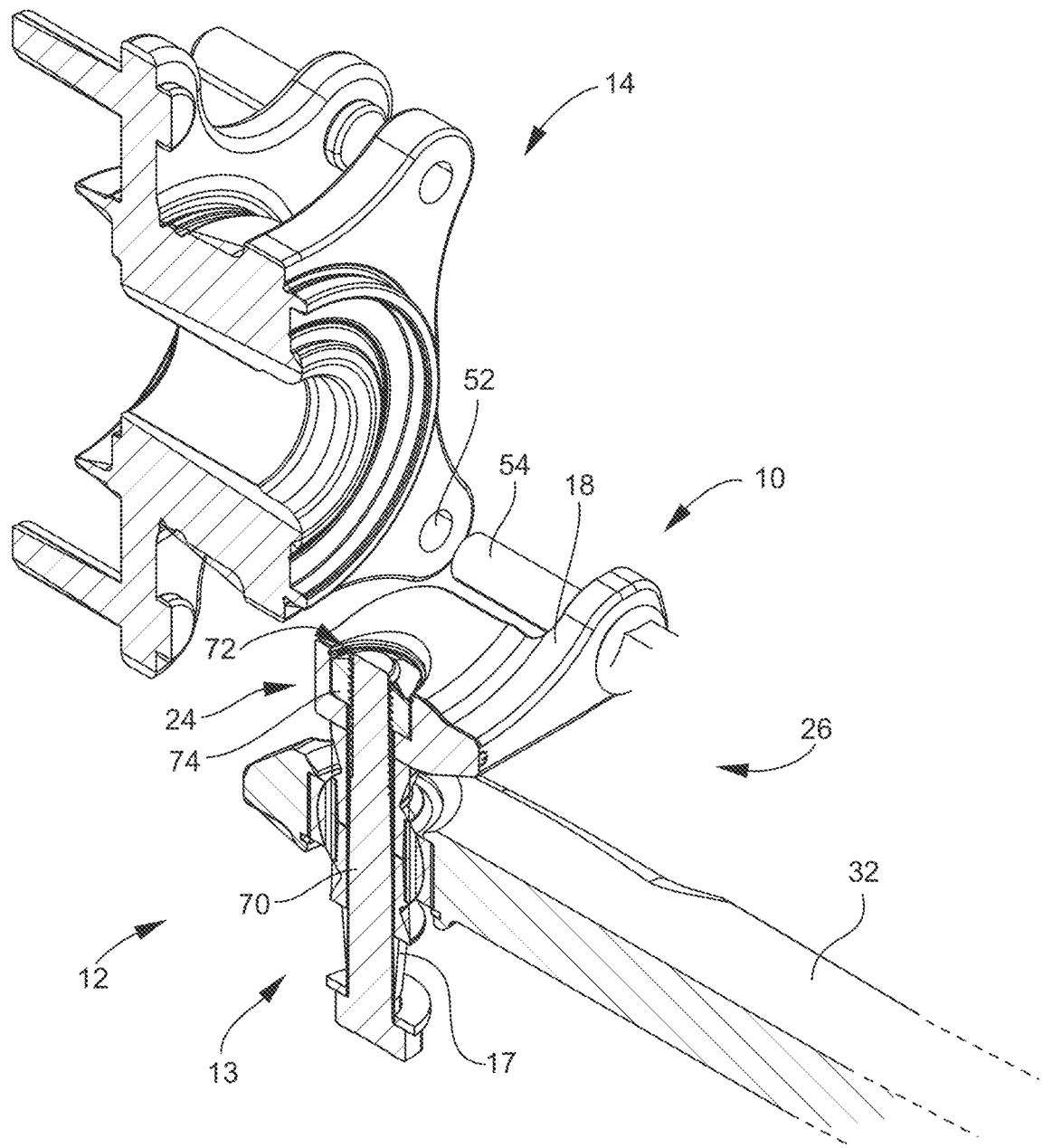
FIG. 10 is partially disassembled cross-sectional perspective view of the spherical bearing mounted in a double shear mounting configuration of FIG. 7 with the device from FIG. 2.

Referring again to FIGS. 2-6, support bracket 18 may be designed and shaped to support spherical bearing 13 at second location 24 to create double shear mounting configuration 12 on suspension knuckle 14. Support bracket 18 may include any component, shape or style of a support mechanism configured for support spherical bearing 13 at second location 24 to create double shear mounting configuration 12 on suspension knuckle 14. In select embodiments of support device 10, the support mechanism 22 may include support plate 62 connected at angle 21 (including, but not limited to, perpendicular, as shown) to the at least one attachment member 20. In select embodiments, the support plate 62 may include side members 64 configured to provide rigidity between the support plate 62 and the at least one attachment member 20. In select embodiments of support device 10, the support mechanism 22 may include support hole 66. As best shown in FIGS. 8-10, the support hole 66 may be configured to receive a top portion 68 of a stud 70 of the spherical bearing 13. In select embodiments, the support mechanism 22 may further include a nut seat 72 connected with support hole 66. The nut seat 72 may be sized and shaped to support a nut 74 threaded onto the top portion 68 of the stud 70 of the spherical bearing 13. However, the disclosure is not so limited, and support mechanism 22 may be provided with just support plate 62 having support hole 66 therethrough without nut seat 72 with nut 74 attached on top of support plate 62. Or, support mechanism 22 may utilize other forms of retention systems or the like for supporting top portion 68 of the stud 70 of spherical bearing 13.

Referring now specifically to FIGS. 7-11, in another aspect, the instant disclosure embraces suspension knuckle 14. Suspension knuckle 14 may generally include support device 10 for strengthening ball joint mounting orientation to double shear mounting configuration 12 with spherical bearing 13 in any of the embodiments and/or combination of embodiments shown and/or described herein. The suspension knuckle 14 may generally include spherical bearing 13 affixed to suspension knuckle 14 at first location 16. The support device 10 may include support bracket 18 mounted or affixed on suspension knuckle 14. Support bracket 18 may include at least one attachment member 20 attached to suspension knuckle 14 approximate spherical bearing 13, and support mechanism 22 affixed to the at least one attachment member 20. The support mechanism 22 may be configured to support the spherical bearing at second location 24 on spherical bearing 13.

Figure 12:
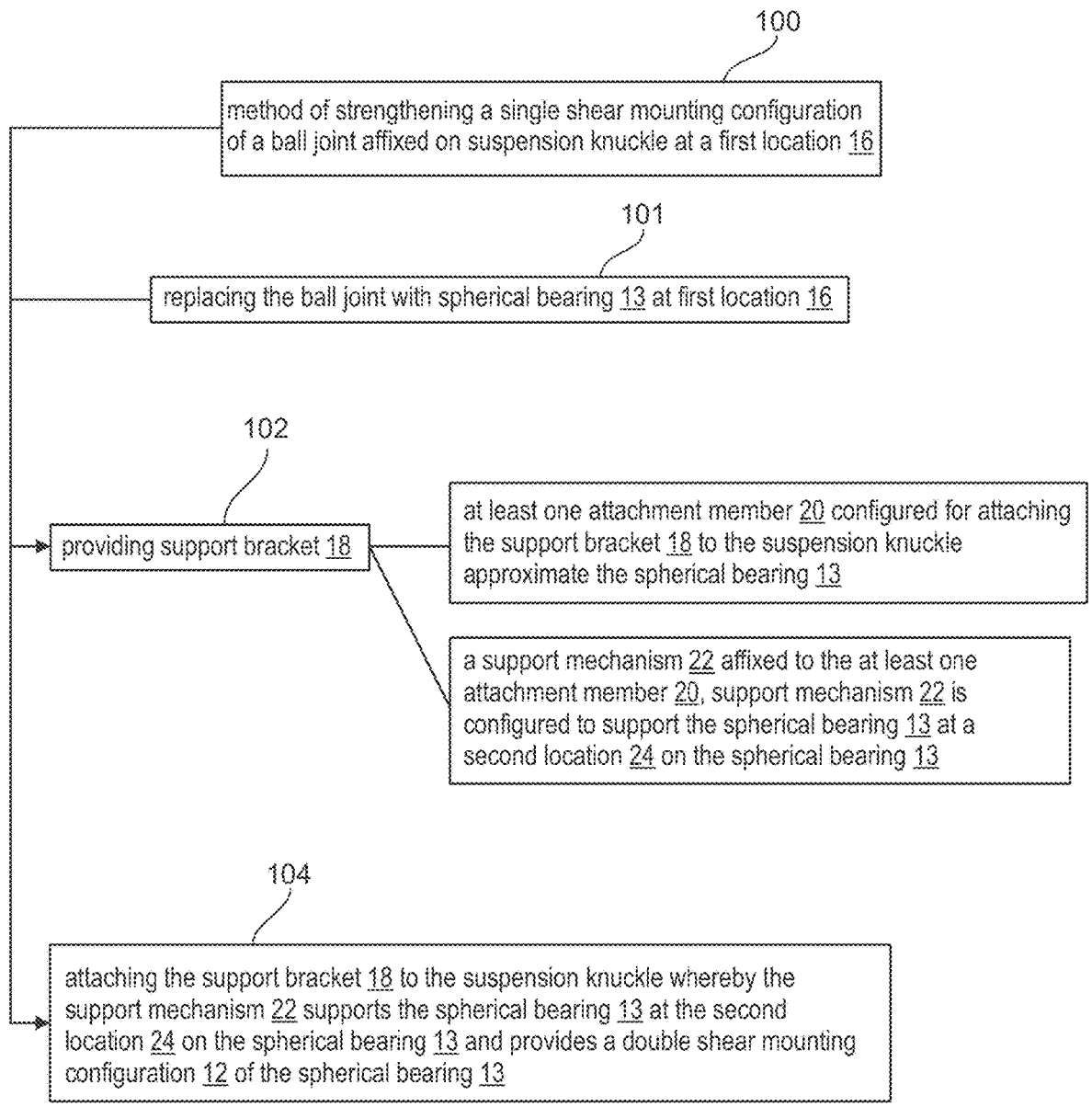
FIG. 12 is a flow diagram of the method for strengthening a single shear mounting configuration of a ball joint affixed on a suspension knuckle according to select embodiments of the instant disclosure.

Referring now to FIG. 12, in another aspect, the instant disclosure embraces method 100 for strengthening a single shear mounting configuration of a ball joint affixed on a suspension knuckle at a first location (like as shown in FIG. 1 of the prior art). Method 100 may generally include utilizing support device 10 for strengthening ball joint mounting orientation to double shear mounting configuration 12 with spherical bearing 13 in any of the embodiments and/or combination of embodiments shown and/or described herein. Method 100 may first include step 101 of replacing the ball joint with spherical bearing 13 attached to the suspension knuckle at first location 16. Method 100 may then generally include step 102 of providing the disclosed support bracket 18 in any of the embodiments and/or combination of embodiments shown and/or described herein. As such, the support bracket 18 provided by the disclosed method 100 may generally include at least one attachment member 20 configured for attaching support bracket 18 to the suspension knuckle 14 approximate spherical bearing 13, and support mechanism 22 affixed to the at least one attachment member 20. The support mechanism 22 may be configured to support the spherical bearing 13 at second location 24 on the spherical bearing 13. With this provided support device, method 100 may further include step 104 of attaching the support bracket 18 to the suspension knuckle 14 whereby the support mechanism 22 supports the spherical bearing 13 at the second location 24 on the spherical bearing 13 and provides double shear mounting configuration 12 of spherical bearing 13.

In select embodiments of step 101 of replacing the ball joint of the prior art with spherical bearing 13, the same mounting hole 15 (see mounting hole 3 from FIG. 1) may be utilized for supporting spherical bearing 13 at first location 16. See FIGS. 7-11). The stud 70 of the spherical bearing 13 may be inserted through same mounting hole 15. Or, in select embodiments where same mounting hole 15 is threaded, sleeve 17 may be inserted through said same mounting hole 15, where sleeve 17 is configured for supporting stud 70 therein said threaded same mounting hole 15.

In sum, the disclosed device 10 and method 100 for strengthening a ball joint mounting orientation to double shear mounting configuration 12 may generally be support bracket 18 that can be made via machined metal or formed sheet metal. As an example, and clearly not limited thereto, support bracket 18 can be utilized to provide the ability to change the OEM ball joint configuration on an OEM suspension knuckle of a UTV/SxS or recreational offroad vehicle and mount that joint in double shear with a spherical bearing to support the joint on opposing sides vs one side (see FIGS. 7-11).

The double shear mounting or double shear mounting configuration 12 provided by the disclosed device 10, bracket 18 or method 100 may give double the strength of the original OEM configuration at that pivot joint 13. The attachment process can be used with bolts and hardware, or by welding to an OEM spindle.

Referring to FIG. 8, an embodiment of the support bracket 18 of support device 10 is shown being used to create a double shear mounting point 12. Support bracket 18 may be attached to an OEM spindle with 2 bolts on the outside. The center hole, or support hole 66, may be where the bolt passes through and supports one side of the spherical bearing (like via top portion 68 of stud 70 of spherical bearing 13).

Referring to FIGS. 9-10, a cutaway is shown of a finished assembly with the support bracket 18 of support device 10 installed. This cutaway views show the bottom side of an OEM suspension knuckle with a spherical bearing 13 on top, the double shear support bracket 18 of support device 10 is positioned above the spherical bearing 13, and a bolt or stud 70 of the spherical bearing 13 passes through the complete assembly. The double shear mounting configuration 12 is provided by support bracket 18 of support device 10 being attached to the OEM spindle with 2 bolts locating and supporting the bracket.

A feature of the present disclosure may be its ability to convert an OEM suspension pivot ball joint between an arm and spindle from a single shear configuration to double shear mounting configuration 12 with spherical bearing 13.

Another feature of the present disclosure may be its ability to greatly strengthen an OEM suspension configuration and reduce stress on hardware.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. A support device configured for strengthening a single shear mounting configuration of a suspension knuckle, the support device comprising:
   a spherical bearing including a stud portion and a ball portion, the stud portion including a bottom stud portion extending from a bottom of the ball portion, and a top stud portion extending from a top of the ball portion;
   the spherical bearing is attached to the suspension knuckle at a first location on the suspension knuckle via the bottom stud portion;
   a support bracket including:
      at least one attachment member configured for attaching the support bracket to the suspension knuckle approximate the top stud portion of the spherical bearing; and
      a support mechanism affixed to the at least one attachment member, the support mechanism is configured to support the spherical bearing at a second location via the top stud portion of the spherical bearing, the support mechanism including a support hole configured to receive the top stud portion of the stud portion of the spherical bearing;
      the support mechanism further including a nut seat connected with the support hole, the nut seat is sized and shaped to support a nut threaded onto the top stud portion of the stud portion of the spherical bearing;
   wherein, the support device is designed or configured to modify an existing ball joint assembly from the single shear mounting configuration to a double shear mounting configuration with the spherical bearing.

2. The support device according to claim 1, wherein the support bracket is configured to provide the double shear mounting configuration of the spherical bearing on the suspension knuckle via combined support from the first location in combination with the second location on the spherical bearing.

3. The support device according to claim 2, wherein the double shear mounting configuration is designed or configured to create a stronger and more stable mounting configuration for the existing ball joint assembly on the suspension knuckle.

4. The support device according to claim 2 wherein, the support device is designed or configured to convert an original equipment manufacturer (OEM) suspension pivot ball joint of the existing ball joint assembly between a suspension component and the suspension knuckle from the single shear configuration to the double shear mounting configuration with the spherical bearing.

5. The support device according to claim 4 being designed or configured to greatly strengthen the single shear mounting configuration of the original equipment manufacturer (OEM) suspension pivot ball joint and reduce stress on hardware.

6. The support device according to claim 1, wherein the at least one attachment member including at least one attachment flange configured and shaped for mounting the support bracket to the suspension knuckle.

7. The support device according to claim 6, wherein the at least one attachment member includes two of the attachment flanges, each of the two attachment flanges being configured and shaped for mounting the support bracket to the suspension knuckle.

8. The support device according to claim 6 further comprising hardware, welding, or a combination thereof configured for mounting each of the at least one attachment flange of the support bracket to the suspension knuckle.

9. The support device according to claim 6, wherein each of the at least one attachment flange including an attachment hole therethrough, each attachment hole is configured for receiving a mechanical fastener therethrough for mounting the support bracket to the suspension knuckle.

10. The support device according to claim 9, wherein the at least one attachment member including two attachment flanges, a first attachment flange with a first attachment hole therethrough and a second attachment flange with a second attachment hole therethrough.

11. The support device according to claim 10, wherein the first attachment hole on the first attachment flange is configured to mount the support bracket to an existing first threaded hole on the suspension knuckle via a first bolt, and the second attachment hole on the second attachment flange is configured to mount the support bracket to an existing second threaded hole on the suspension knuckle via a second bolt.

12. The support device according to claim 10 comprising a connecting member affixed between the two attachment flanges, the connecting member is configured for connecting the support mechanism with the two attachment flanges.

13. The support device according to claim 12, wherein the connecting member including a cutout, the cutout is configured to fit around a suspension member connected to the suspension knuckle.

14. The support device according to claim 1, wherein the support mechanism including a support plate connected at an angle to the at least one attachment member, said support plate including side members configured to provide rigidity between the support plate and the at least one attachment member.

15. A suspension knuckle comprising:
a spherical bearing including a stud portion and a ball portion, the stud portion including a bottom stud portion extending from a bottom of the ball portion, and a top stud portion extending from a top of the ball portion, the spherical bearing is affixed to the suspension knuckle at a first location via the bottom stud portion;
a support bracket including:
at least one attachment member attached to the suspension knuckle approximate the top stud portion of the spherical bearing; and
a support mechanism affixed to the at least one attachment member, the support mechanism is configured to support the spherical bearing at a second location via the top stud portion of the spherical bearing, the support mechanism including a support hole configured to receive the top stud portion of the stud portion of the spherical bearing;
the support mechanism further including a nut seat connected with the support hole, the nut seat is sized and shaped to support a nut threaded onto the top stud portion of the stud portion of the spherical bearing.

16. The suspension knuckle according to claim 15, wherein:
the support bracket is configured to provide a double shear mounting configuration of the spherical bearing on the suspension knuckle via combined support from the first location in combination with the second location on the spherical bearing;
the double shear mounting configuration is designed or configured to create a stronger and more stable mounting configuration for the spherical bearing on the suspension knuckle;
the at least one attachment member including two attachment flanges, each of the two attachment flanges being configured and shaped for mounting the support bracket to the suspension knuckle;
the support bracket further includes hardware, welding, or a combination thereof configured for mounting each of the attachment flanges of the support bracket to the suspension knuckle;
the support bracket further including a connecting member affixed between the two attachment flanges, the connecting member is configured for connecting the support mechanism with the two attachment flanges;
the support mechanism including a support plate connected at an angle to the at least one attachment member, said support plate including side members configured to provide rigidity between the support plate and the at least one attachment member.

17. The suspension knuckle according to claim 16, wherein:
the two attachment flanges including a first attachment flange with a first attachment hole therethrough and a second attachment flange with a second attachment hole therethrough, wherein the first attachment hole on the first attachment flange is configured to mount the support bracket to an existing first threaded hole on the suspension knuckle via a first bolt, and the second attachment hole on the second attachment flange is configured to mount the support bracket to an existing second threaded hole on the suspension knuckle via a second bolt.

18. A method for strengthening a single shear mounting configuration of a ball joint affixed on a suspension knuckle at a first location, the method comprising:
providing a spherical bearing including a stud portion and a ball portion, the stud portion including a bottom stud portion extending from a bottom of the ball portion, and a top stud portion extending from a top of the ball portion;
replacing the ball joint on the suspension knuckle with the spherical bearing attached to the suspension knuckle at the first location via the bottom stud portion;
providing a support bracket including:
at least one attachment member configured for attaching the support bracket to the suspension knuckle approximate the top stud portion of the spherical bearing;
a support mechanism affixed to the at least one attachment member, the support mechanism is configured to support the spherical bearing at a second location via the top stud portion of the spherical bearing, the support mechanism including a support hole configured to receive the top stud portion of the stud portion of the spherical bearing;
the support mechanism further including a nut seat connected with the support hole, the nut seat is sized and shaped to support a nut threaded onto the top stud portion of the stud portion of the spherical bearing; and attaching the support bracket to the suspension knuckle whereby the support mechanism supports the spherical bearing at the second location via the top stud portion of the spherical bearing and provides a double shear mounting configuration of the spherical bearing.

\* \* \* \* \*